United States Patent
Bosco et al.

(10) Patent No.: US 7,715,215 B1
(45) Date of Patent: May 11, 2010

(54) CONTROL OF AN AC-TO-DC POWER SUPPLY ASSEMBLY FED BY A THREE-PHASE AC SOURCE

(75) Inventors: Frank E. Bosco, Poughkeepsie, NY (US); Kevin R. Covi, Glenford, NY (US); Anthony J. Cozzolino, New Paltz, NY (US); Gary F. Goth, Pleasant Valley, NY (US); Raymond J. Harrington, Staatsburg, NY (US); Peter A. Hein, Poughkeepsie, NY (US); Raymond A. Longhi, Poughkeepsie, NY (US); Edward J. Seminaro, Milton, NY (US); Peter A. Wendling, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/361,639

(22) Filed: Jan. 29, 2009

(51) Int. Cl.
*H02M 7/00* (2006.01)
*H02M 5/42* (2006.01)

(52) U.S. Cl. .............................. 363/67; 363/69; 363/92; 363/129

(58) Field of Classification Search .................. 363/65, 363/67, 69, 70, 87, 92, 125–129
See application file for complete search history.

(56) References Cited

U.S. PATENT DOCUMENTS

| | | | |
|---|---|---|---|
| 6,700,343 B2 * | 3/2004 | Masaki et al. ............... | 318/434 |
| 6,801,382 B2 * | 10/2004 | Kimura et al. ............ | 360/73.03 |
| RE38,846 E * | 10/2005 | Walters et al. ............... | 323/272 |
| 7,106,017 B2 * | 9/2006 | Kifuku et al. ........... | 318/400.22 |
| 7,219,258 B2 | 5/2007 | LeVangia et al. | |
| 7,492,134 B2 * | 2/2009 | Tang et al. ................... | 323/241 |
| 2002/0129009 A1 | 9/2002 | Kehne et al. | |

OTHER PUBLICATIONS

Corrado et al., "Method and System for Automated Energy Usage Monitoring Within a Data Center", U.S. Appl. No. 11/956,405, filed Dec. 14, 2007.
Broyles et al., "Improving Processor Performance During Power Supply Failure", U.S. Appl. No. 12/241,134, filed Sep. 30, 2008.

* cited by examiner

*Primary Examiner*—Jessica Han
(74) *Attorney, Agent, or Firm*—Geraldine Monteleone, Esq.; Kevin P. Radigan, Esq.; Heslin Rothenberg Farley & Mesiti, P.C.

(57) ABSTRACT

Control of an AC-to-DC power supply assembly fed by a three-phase AC source is provided by: determining whether the power supply assembly includes greater than three single-phase power regulators feeding a common load, with multiple regulators being connected in parallel across a common phase of the AC source, and if so, summing currents provided by the regulators to the common load; and ascertaining whether the summed current is less than a predefined threshold, and if yes, operating the power supply assembly in a line balance mode to maintain power drawn on the phases of the AC source in balance, and if greater than the predefined threshold, operating the power supply assembly in a maximize power mode wherein power is provided to the common load without maintaining power drawn on the phases of the AC source in balance.

20 Claims, 8 Drawing Sheets

CONTROL OF AN AC-TO-DC POWER SUPPLY ASSEMBLY FED BY A THREE-PHASE AC SOURCE

TECHNICAL FIELD

The present invention relates in general to power supply assemblies, and in particular, to a computer-implemented method, system and computer-usable program code for controlling an AC-to-DC power supply assembly powered by a three-phase AC source, and feeding a common load, such as one or more data processing systems of an electronics rack.

BACKGROUND OF THE INVENTION

Electrical power is conventionally supplied to a data processing system by a power supply unit. A power supply unit is a component of a data processing system that transforms, converts, or otherwise conditions electrical power received from, for example, the power grid and provides the transformed, converted, or conditioned electrical power to one or more other components of the data processing system.

In many data processing systems, multiple power supply units supply power to the various components of the data processing system. Multiple power supply units are often employed to provide increased power, as well as provide redundancy so that a catastrophic failure and complete shutdown of the data processing system can be avoided. Several power supply units enable the operation of the data processing system under partial power conditions. Further, more than one power supply unit is common in many data processing systems with several processors.

In one implementation, a data processing system resides within an electronics rack, which may be, for example, a stand alone computer processing system having high, mid or low-end processing capability. As circuit densities continue to increase at all levels of packaging, there is an ever-growing need for providing more power to the data processing system, such as to an electronics rack comprising one or more electronics subsystems. Further, this need to provide power continues to exist notwithstanding various atypical conditions which may occur in the power supply assembly.

SUMMARY OF THE INVENTION

Briefly summarized, provided herein in one aspect is a method of controlling an AC-to-DC power supply assembly fed by a three-phase AC source. The method includes: determining whether the AC-to-DC power supply assembly includes greater than three active, single-phase power regulators feeding a common load, with multiple single-phase power regulators of the active, single-phase power regulators being connected in parallel across a common phase of the three-phase AC source; summing currents provided by the active, single-phase power regulators to the common load, the summing being responsive to determining that there are greater than three active, single-phase power regulators in the AC-to-DC power supply assembly being powered by the three-phase AC source and feeding the common load; and ascertaining whether the summed current is less than a predefined threshold, and if so, operating the AC-to-DC power supply assembly in a line balance mode to maintain power drawn on the three phases of the three-phase AC source in balance, and if greater than the predefined threshold, then operating the AC-to-DC power supply assembly in a maximize power mode wherein power is provided by the AC-to-DC power supply assembly to the common load without maintaining power drawn on the three phases of the three-phase AC source in balance.

In another aspect, a control system is provided for an AC-to-DC power supply assembly of an electronics rack fed by at least one three-phase AC source. The control system includes a frame controller and at least one sensor for sensing currents. The frame controller determines when the AC-to-DC power supply assembly includes greater than three active, single-phase power regulators being powered by a common three-phase AC source and feeding a common load within the electronics rack, with multiple single-phase power regulators of the active, single-phase power regulators being connected in parallel across a common phase of the common three-phase AC source. The at least one sensor senses currents provided by the greater than three active, single-phase power regulators to the common load, and these currents are summed by the frame controller responsive to determining that there are greater than three active, single-phase power regulators in the AC-to-DC power supply assembly being powered by the common three-phase AC source and feeding the common load. The frame controller further ascertains whether the summed current is less than a predefined threshold, and if so, operates the AC-to-DC power supply assembly in a line balance mode to maintain power drawn on the three phases of the common three-phase AC source in balance, and if greater than the predefined threshold, operates the AC-to-DC power supply assembly in a maximize power mode wherein power is provided by the greater than three active, single-phase power regulators without maintaining power drawn on the three phases of the common three-phase AC source in balance.

In a further aspect, an article of manufacture is provided which includes at least one computer-readable medium having computer-readable program code logic to control an AC-to-DC power supply assembly fed by a three-phase AC source. The computer-readable program code logic when executing on a processor performing: determining whether the AC-to-DC power supply assembly comprises greater than three active, single-phase power regulators feeding a common load, with multiple single-phase power regulators of the active, single-phase power regulators being connected in parallel across a common phase of the three-phase AC source; summing currents provided by the active, single-phase power regulators to the common load, the summing being responsive to determining that there are greater than three active, single-phase power regulators in the AC-to-DC power supply assembly being powered by the three-phase AC source and feeding the common load; and ascertaining whether the summed current is less than a predefined threshold, and if so, operating the AC-to-DC power supply assembly in a line balance mode to maintain power drawn on the three phases of the three-phase AC source in balance, and if greater than the predefined threshold, operating the AC-to-DC power supply assembly in a maximize power mode, wherein power is provided by the AC-to-DC power supply assembly to the common load without maintaining power drawn on the three phases of the three-phase AC source in balance.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

As used herein, the term "electronics rack" includes any housing, frame, rack, compartment, blade server system, etc., having one or more components of a data processing system or electronics system, and may be, for example, a stand alone computer processing system having high, mid or low end processing capability. An electronics rack comprises at least one electronics subsystem. "Electronics subsystem" refers to any sub-housing, blade, book, drawer, node, compartment, etc., having one or more electronic components disposed therein. Each electronics subsystem of an electronics rack may be movable or fixed relative to the rack unit, with the electronics drawers of a multi-drawer rack unit and blades of a blade center system being two examples of electronics subsystems of an electronics rack.

Reference is made below to the drawings, which are not drawn to scale, and wherein the same reference numbers used throughout different figures designate the same or similar components.

Figure 1:
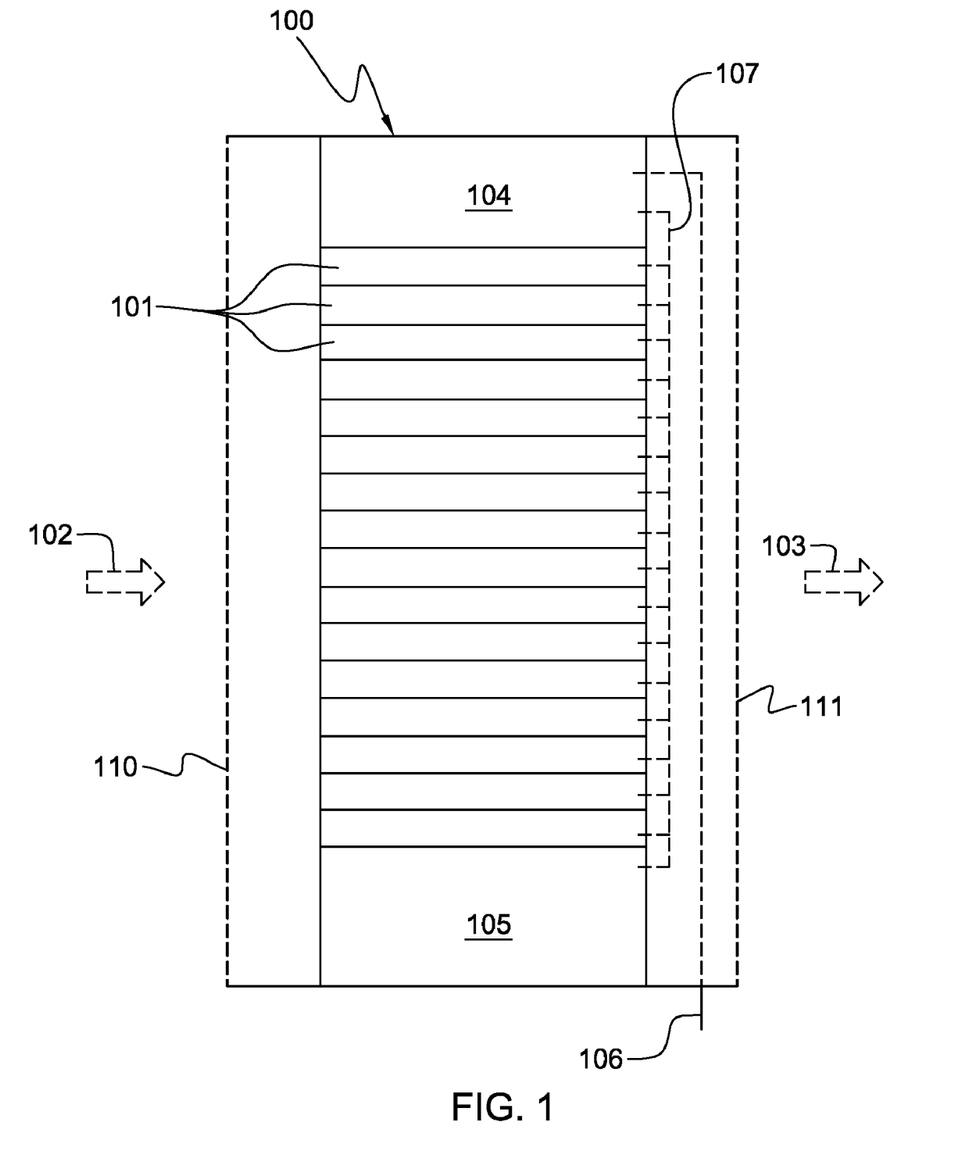
FIG. 1 is a cross-sectional elevational view of one embodiment of an electronics rack with an AC-to-DC power supply assembly, in accordance with an aspect of the present invention.

FIG. 1 is an elevational representation of one embodiment of an electronics rack 100 with an AC-to-DC power supply assembly, in accordance with an aspect of the present invention. Electronics rack 100 includes a plurality of electronics subsystems 101, which (in the embodiment illustrated), are air-cooled by cool air 102 ingressing via louvered air inlet door 110, and exhausting out louvered air outlet door 111 as hot air 103. Electronics rack 100 also includes at least one bulk power assembly 104 of the AC-to-DC power supply assembly. AC-to-DC power supply assembly further includes, in one embodiment, a frame controller, which may be resident in the bulk power assembly 104 and/or in one or more electronic subsystems 101. Each electronic subsystem 101 includes, in one example, one or more processors and associated memory. Also illustrated in FIG. 1 is one or more input/output (I/O) drawer(s) 105, which may also include a switch network. I/O drawer(s) 105 include, for example, PCI card slots and disk drivers for the electronics rack.

A three-phase AC source feeds power via an AC power supply line cord 106 to bulk power assembly 104, which transforms the supplied AC power to an appropriate DC power level for output via distribution cable 107 to the plurality of electronics subsystems 101 and I/O drawer(s) 105. AC power supply line cord 106 supplies, in one example, three phases for international 415 $V_{RMS}$, and has a current limit rating, for example, of 100 amps. The number of electronic subsystems installed in the electronics rack is variable and depends on customer requirements for a particular system. Further, as explained below, the number of bulk power regulators within each bulk power assembly of the AC-to-DC power supply assembly is also variable and is determined, in one implementation, by the number of electronic subsystems installed in the electronics rack, or more particularly, by the power requirements of the common load of the electronics rack being fed by the AC-to-DC power supply assembly.

As a detailed example, each single-phase bulk power regulator may provide an 8.8 kW power capability to the common load. If the common load, comprising the electronic subsystem(s), requires more than 24 kW, then a fourth BPR may need to be added to the bulk power assembly. This fourth BPR can be added in parallel to one of the BPRs connected across a phase of the three-phase AC source, such that two BPRs share a common phase of the AC source. Further, assume that the AC power supply line cord has a current limit rating of 100 amps, which limits the input power to 88 amps per phase (0.8×100 A+10%). Thus, the addition of a fourth BPR results in unbalanced phase currents. That is, at 24 kW, phase currents to the four BPRs in the bulk power assembly would be 88 amp, 88 amp, and 63 amp at the 100 amp line cord limit.

Figure 2:
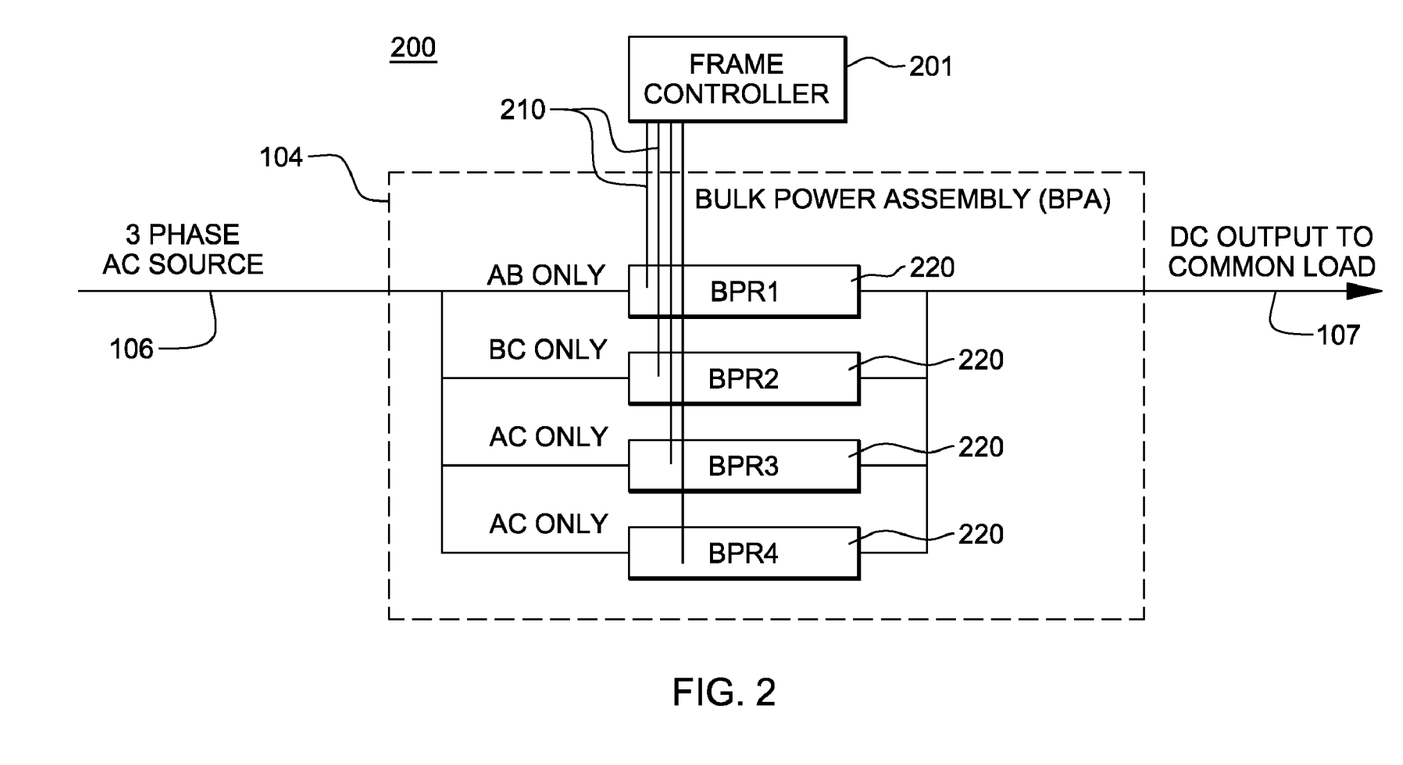
FIG. 2 is a block diagram representation of one embodiment of an AC-to-DC power supply assembly, comprising a bulk power assembly and a frame controller, in accordance with an aspect of the present invention.

FIG. 2 illustrates one example of an AC-to-DC power supply assembly 200 comprising a frame controller 201 and a bulk power assembly 104, which in this example comprises four single-phase bulk power regulators 220 (labeled BPR1, BPR2, BPR3 & BPR4). A serial communications bus 210 allows communication between frame controller 201 and bulk power regulators 220 of bulk power assembly 104. The three-phase AC source is input 106 to bulk power assembly 104, and bulk power assembly 104 outputs 107 DC power to a common load. In one typical electronics rack example, 350 volts DC power is output to the common load of the rack from the bulk power assembly.

Figure 3:
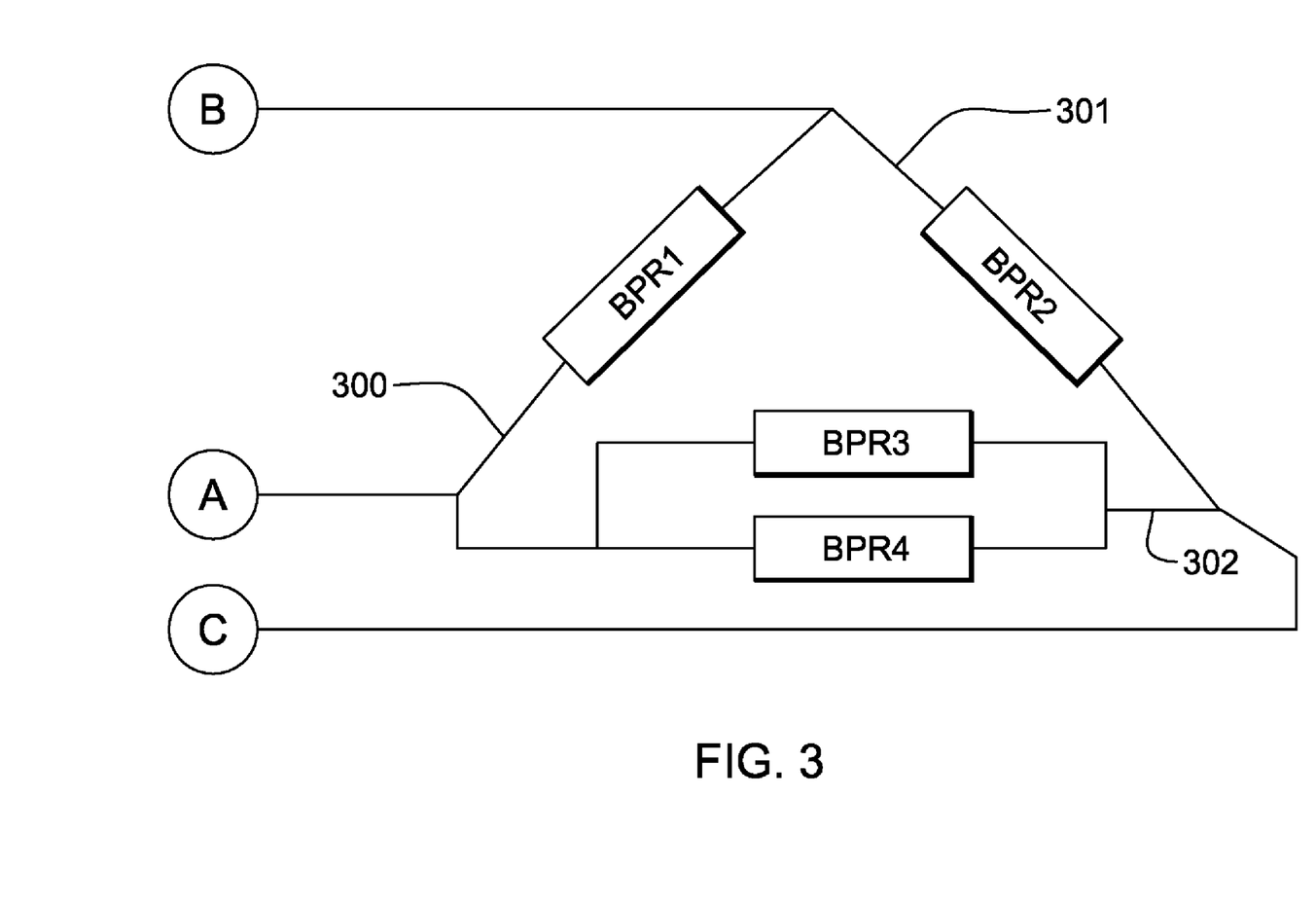
FIG. 3 is a schematic of one embodiment of three-phase AC source connections of four bulk power regulators (BPRs) of a bulk power assembly such as depicted in FIG. 2, in accordance with an aspect of the present invention.
Figure 4:
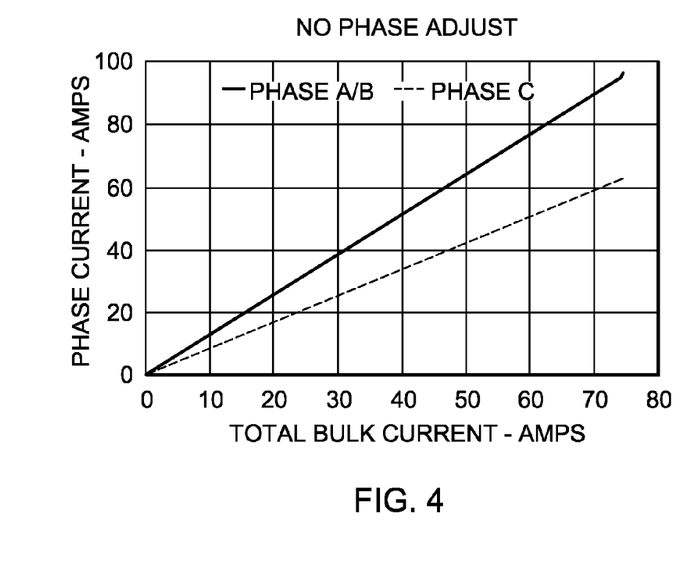
FIG. 4 is a graph of phase current drawn on a three-phase AC source versus current provided by a bulk power assembly (such as depicted in FIG. 2) without phase balancing control, in accordance with an aspect of the present invention.

As illustrated in FIG. 3, in this example, BPR1 is connected 300 across phase AB of the three-phase AC source, BPR2 is connected 301 across phase BC of the three-phase AC source, and BPR3 and BPR4 are connected 302 in parallel across a common phase AC of the three-phase AC source. As noted, the fourth single-phase bulk power regulator may be needed in order to provide further DC output power to the common load, for example, if the common load passes the 25 kW level in the example described above. Also, although described herein as four bulk power regulators within the bulk power assembly, more than four bulk power regulators may be employed, for example, by coupling an additional BPR across one or both of phases AB and BC, and further coupling additional bulk power regulators across phase AC in FIG. 3. The result of adding a fourth (or more) bulk power regulator to a bulk power assembly being powered by a three-phase AC source is illustrated in FIG. 4, wherein the current drawn on the three phases of the three-phase AC source is plotted against the total bulk current output from the bulk power assembly. As illustrated in FIG. 4, without any proactive line cord balancing across the three phases, line cord imbalances increase as the total bulk current output increases. The imbalance is the result of the two bulk power regulators in parallel pulling power from the same phase.

Figure 5:
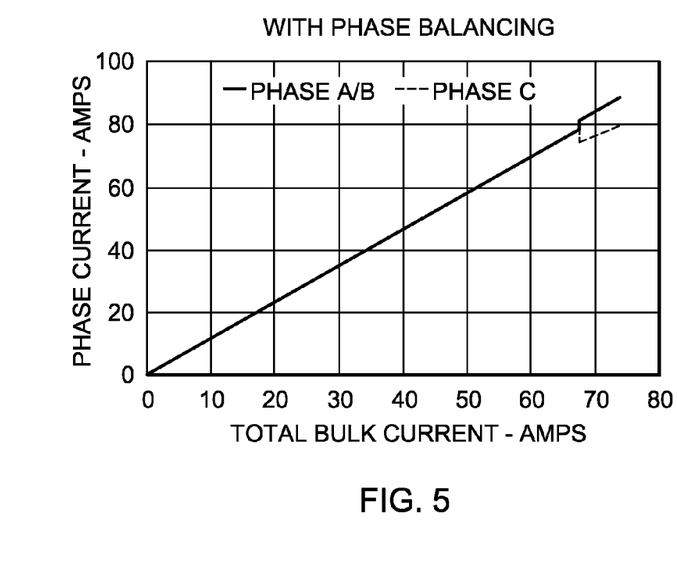
FIG. 5 is a graph of phase current drawn on a three-phase AC source versus current provided by a bulk power assembly (such as depicted in FIG. 2) with phase balancing control, in accordance with an aspect of the present invention.

FIG. 5 depicts an alternative plot of phase current versus total bulk current supplied pursuant to a control protocol, in accordance with an aspect of the present invention. In accordance with this invention, a line balance mode is employed wherein current drawn on each of the three phases is maintained in balance (notwithstanding the presence of greater than three single-phase power regulators), until the total bulk current supplied reaches a predefined threshold. As explained further below, the predefined threshold is selected as a function of the current limit rating of the three-phase AC source feeding the bulk power assembly. In one example, the threshold is 67.7 amps for the 100 amp line source and bulk power regulators described above. At this threshold, the power assembly enters a maximize power mode, wherein the phase currents provided from the three-phase AC source are no longer maintained in balance (and thus diverge slightly), but overall power output from the bulk power assembly is increased, as illustrated in FIG. 5.

To summarize, provided herein is a control protocol for an AC-to-DC power supply assembly fed by a common three-phase AC source. The AC-to-DC power supply assembly operates in either a line balance mode or a maximize power mode. The assembly operates in the line balance mode when the summed current output by the bulk power regulators is below a predefined threshold, and operates in the maximize power mode when the summed current is above the predefined threshold. As noted, the threshold, in one embodiment, is a function of the current limit rating for the line cord providing power from the three-phase AC source. Assuming that the power requirements to the common load remain below the predefined (current) threshold, then the AC-to-DC power supply assembly is maintained in the line balance mode, and if greater power is required by the common load, then the frame controller switches to the maximize power mode, wherein line balancing is no longer achieved, but additional power (above the predefined current threshold) is provided to the common load. This multi-mode control approach of the bulk power assembly can be employed with four or more active, single-phase power regulators feeding a common load and powered by a common three-phase AC source. The need for proactive balancing and switching between modes is obviated if the number of bulk power regulators is a multiple of three, since by definition, an even number of bulk power regulators connected per phase inherently results in balanced drawing of phase current.

In one implementation, the control approach described herein is implemented as a software (or logic) solution that allows, for example, system configurations with four BPRs to be shipped without a redesign of the bulk power assembly to enforce AC input current sharing in hardware. It can be shown that adding a fourth BPR without phase balancing (i.e., that is, without digital to analog converter adjustment as described below) will not result in increased bulk power assembly output since the addition of the fourth BPR results in unbalanced phase currents, and a line cord limit with a reduced current on the shared phase. Note that the control logic described herein can operate to, for example, control voltage output of the two BPRs not sharing a common phase, or to control voltage output of the two BPRs sharing a common phase. For example, the frame controller may periodically write the BPRs that are not connected in parallel with appropriate digital to analog converter offsets which will raise their output voltage, and cause the system load to shift towards those phases. This functionality is explained below in greater detail with reference to FIGS. 6 & 7.

Figure 6:
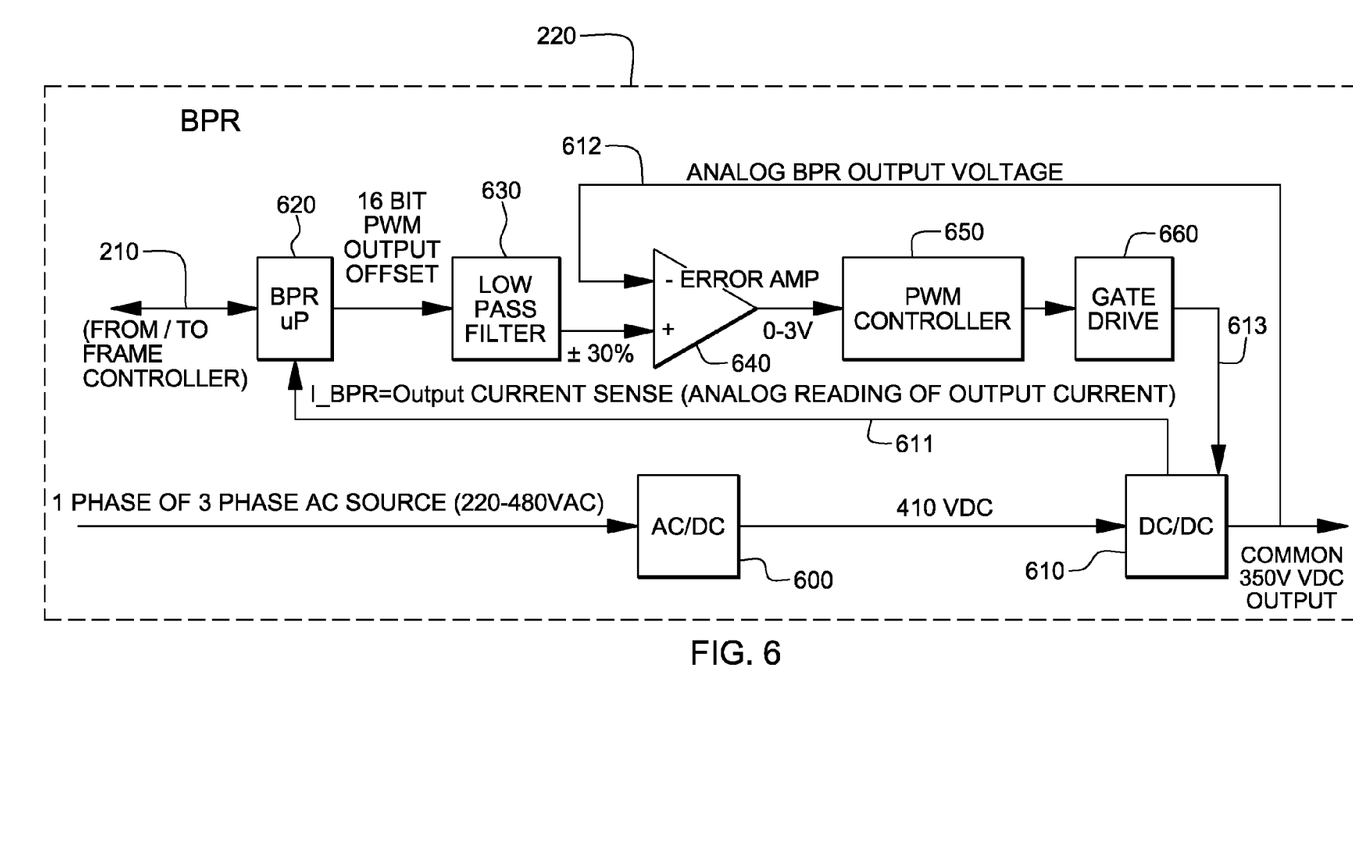
FIG. 6 depicts one embodiment of a bulk power regulator with power load adjust circuitry, in accordance with an aspect of the present invention.

FIG. 6 depicts one embodiment of a bulk power regulator (BPR) with load adjust, in accordance with an aspect of the present invention. As illustrated, bulk power regulator 220 includes an AC-to-DC converter 600 which receives as input one phase of a three-phase AC source (for example, in the range of 220-480 volts AC). Output from AC-to-DC converter 600 is, in one example, 410 volts DC, which is fed to a DC-to-DC converter 610. In one example, DC-to-DC converter comprises IGBT switching devices and is configured to step down the supplied voltage from 410 volts DC to 350 volts DC for output to the common load. The BPR further comprises BPR load adjust circuitry, which includes a BPR microprocessor 620 coupled via the serial communications 210 with the frame controller. BPR microprocessor 620 outputs, for example, a 16 bit pulse width modulated (PWM) offset signal to a low pass filter 630. Low pass filter 630 outputs a ±30% signal to an error amp 640, which also receives as input the analog value of the output voltage 612. Error amp 640 provides a 0 to 3 volt signal to a pulse width modulator (PWM) controller 650, which is coupled to a gate drive 660. Gate drive 660 provides a gate drive signal 613 to appropriately adjust the current output from DC-to-DC converter 610. The current provided by DC-to-DC converter 610 is also sensed and returned via line 611 to BPR microprocessor 620 for return back to the frame controller, as described further below. The signal I_BPR is a signal representative of the amount of current currently being fed into the common load from this particular BPR. Note that in FIG. 6, the offset signal to adjust the DC/DC converter is being provided by the frame controller to the BPR microprocessor 620.

Figure 7:
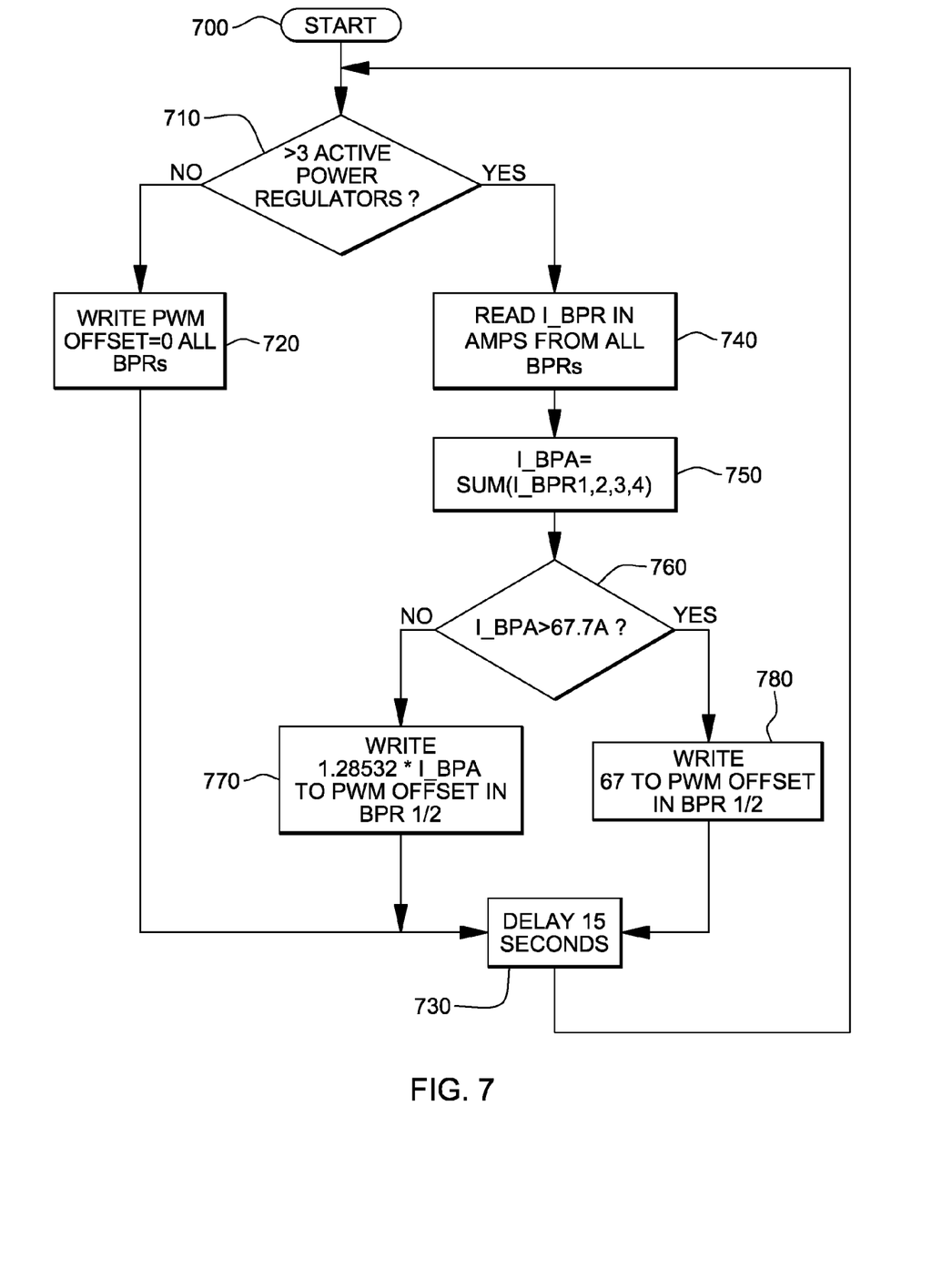
FIG. 7 is a flowchart of one embodiment of logic for a frame controller controlling a bulk power assembly of an AC-to-DC power supply assembly, in accordance with an aspect of the present invention.

FIG. 7 is a flowchart of one embodiment of frame controller logic for operating the AC-to-DC power supply assembly in either the line balance mode or the maximize power load, dependent upon current being supplied by the bulk power assembly. The logic begins 700 with a determination of whether there are greater than three active, single-phase power regulators being powered by a common three-phase AC source and feeding a common load 710. If "no", then the frame controller writes a PWM offset of zero to all BPRs of the bulk power assembly 720. A PWM offset of zero, which is sent via the serial interface 210 (FIG. 6) to each BPR microprocessor, results in a zero load adjustment being applied to each BPR. The logic then waits a period of time (for example, 15 seconds) 730, before repeating the determination of whether there are currently greater than three active, single-phase power regulators in the AC-to-DC power supply assembly feeding the load.

Assuming that there are four or more active, single-phase power regulators being powered by a common three-phase AC source and feeding a common load, then the logic reads the actual BPR current output from each of the BPRs using the serial interface coupling the frame controller to each BPR microprocessor (see FIG. 6). The values reported by the BPRs are measured in amperes, and are sensed at the DC-to-DC converter of each BPR 740. The frame controller sums the currents from the BPRs 750, and this value (I_BPA) represents the total output current of the bulk power assembly to the common load. The total output current value is proportional to the input AC current from the three-phase AC source. A threshold value (for example, 67.7 amps in the 100 amp AC source embodiment described above) is predefined to represent the point at which the AC input current would exceed the capability of the line cord. Below this point, phase currents are maintained in balance, while above this point, phase currents are allowed to become unbalanced, but only slightly, as illustrated in FIG. 5. The logic determines whether the I_BPA value is below the predefined threshold (e.g., 67.7 in the 100 amp example described above) 760. If so, then the logic balances the phases equally by writing 1.28532×I_BPA to the BPR's output offset register located in the BPR microprocessor of at least two of the BPRs. In the example illustrated, only the two BPRs not in parallel have their output offsets modified, that is, BPR1 and BPR2 in the example of FIGS. 2 & 3 770.

Note that in this example, 67.7 is the predefined threshold number, which a function of the current limit rating of the three-phase AC source, that is, 100 amps (by way of example). When this limit is exceeded, line cord balancing can no longer be maintained, and maximize power mode is entered. The value 1.8532 is ascertained by determining the change in voltage to be achieved by writing a value to the DC/DC converter of the BPR. For example, if two BPRs are connected in parallel across a common phase, then the change in voltage is such that the current through one of the BPRs not connected in parallel is equal to twice the current through the BPRs connected in parallel. This achieves an equal current in the four BPRs. Thus, the desired change in voltage for a four BPR example is equal to the BPR's output impedance divided by six (since two BPRs are in parallel across a common phase). As one specific example, output impedance of a BPR might be 0.475 ohms. Thus, the total change in voltage is approximately 79.17 milliohms times the I_BPA. If 60 millivolts change per bit is desired, then 79.17 divided by 60 mV per bit equals a DC/DC adjustment of 1.28532×I_BPA. Note that the above-noted values are provided by way of example only, and that the concepts presented herein are not limited to the particular embodiment(s) described.

By adjusting two or more BPRs in the line balance mode, the logic causes the adjusted BPRs' output voltage to rise and additional current to be drawn on the effected phases by the microprocessors changing the duty cycle of their built-in PWM. This results in a higher output voltage at the low pass filter, and when the error amp detects the new voltage and the desired output, it increases the signal to the pulse width modulator. The change at the pulse width modulator causes the gate drive to raise the output voltage. Based on the output resistance (load line), the individual BPR's output current will no longer be equal, but the phase current on the AC input line will be equal.

Continuing with the logic of FIG. 7, if above the predefined threshold (for example, the 67.7 amp limit described above) AC phases are balanced to the greatest extent possible, while maximizing BPR output power. This is achieved by writing, for example, an output offset value (0x67) to the two BPRs that are not in parallel using the above-outlined steps 780. After adjusting the PWM offset, the logic waits a predefined interval 730 before repeating the process.

Figure 8:
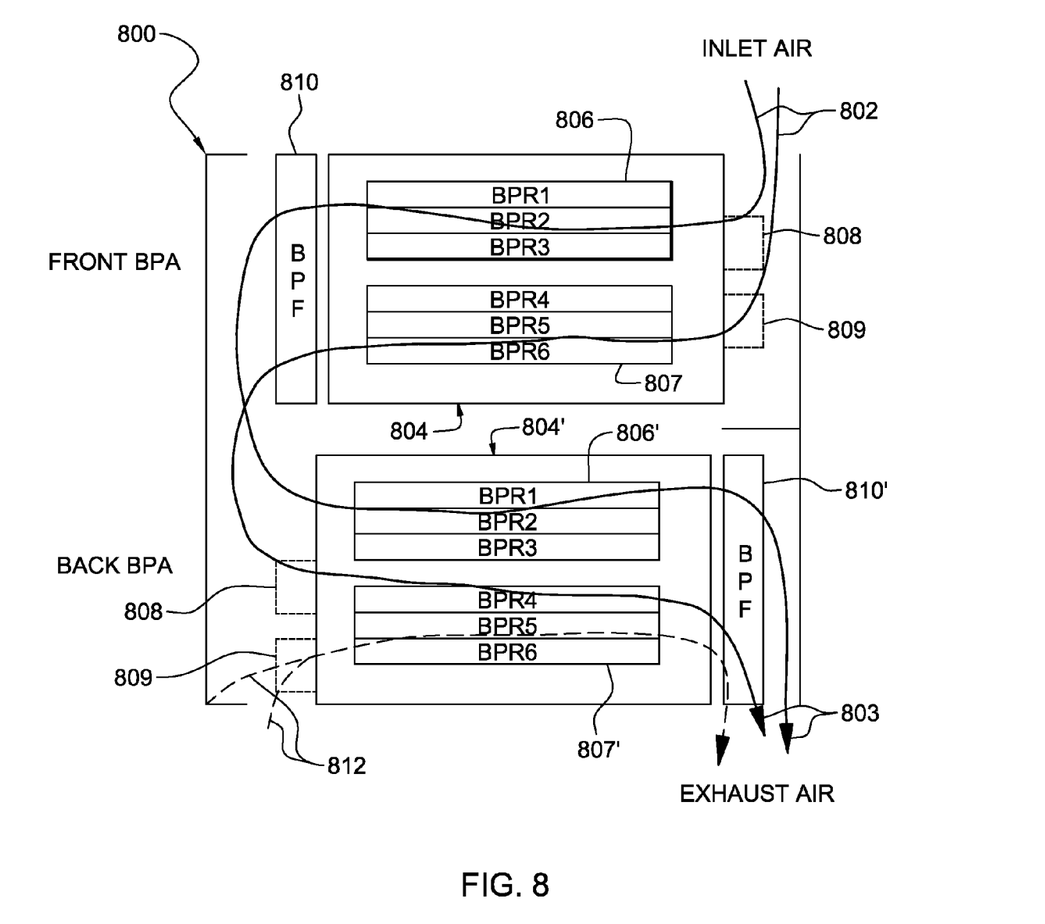
FIG. 8 is a cross-sectional plan view of one embodiment of an electronics rack with an AC-to-DC power supply assembly comprising redundant bulk power assemblies (BPAs) for supplying power to the electronics subsystem(s) of the electronics rack, and which is controlled in accordance with an aspect of the present invention.

FIG. 8 depicts a further control enhancement which may be employed in combination with or separate from the above-described control of the AC-to-DC power supply assembly.

In FIG. 8, a cross-sectional plan view of an electronics rack 800 is illustrated, taken through the AC-to-DC power supply assembly, for example, disposed at the upper portion of the electronics rack. In this example, the AC-to-DC power supply assembly comprises a first, front bulk power assembly 804 and a second, back bulk power assembly 804'. As shown, bulk power assembly 804 comprises six bulk power regulators, with regulators BPR1-BPR3 806 being powered by a first three-phase AC source 808 and regulators BPR4-BPR6 807 being powered by a second, independent three-phase AC source 809. Similarly, the second, back bulk power assembly 804' comprises six bulk power regulators, with regulators BPR1-BPR3 806' powered (in the depicted example) by the first three-phase AC source 808, and regulators BPR4-BPR6 807' powered by the second three-phase AC source 809. Note that if desired, second, back bulk power assembly 804' may be powered by three-phase AC sources which are independent from the three-phase AC sources powering the first, front bulk power assembly 804. As a further alternative, each bulk power assembly may have its regulators powered by a common three-phase AC source, with the common three-phase AC source being different between bulk power assemblies.

Cooling is provided to bulk power assemblies 804, 804' via airflow from a front side to a back side of the electronics rack 800. In the example illustrated, this airflow is facilitated by a front bulk power fan (BPF) 810 associated with bulk power assembly 804 and a back bulk power fan (BPF) 810' associated with bulk power assembly 804'. Inlet air 802 is directed in a sinusoidal manner across the bulk power regulators of the bulk power assemblies 804, 804' by the active drawing of air through bulk power fans 810, 810', with the heated air egressing out the back side of electronics rack 800 as exhaust air 803. In one normal operational embodiment, power to the common load of the electronics rack is supplied equally by bulk power assembly 804 and bulk power assembly 804'. However, certain atypical conditions may result in a degradation of the power to the common load. This could have a catastrophic, system crashing result depending on the extent of power degradation or interruption. Provided herein, therefore, is a control protocol which includes automatically reducing the common load power requirements, that is, the power required by the electronics subsystem(s) within the electronics rack, when the bulk power assembly capacity is exceeded for any one of the following atypical conditions: failure of a bulk power fan, such as the front bulk power fan 801 in FIG. 8; loss of an AC line cord feeding three of the 12 BPRs illustrated in FIG. 8; existence of ambient room conditions out of specification (e.g., >35° C. ambient temperature); or an airflow anomaly within one or both of the BPAs 804, 804'.

For example, when a hot BPA environment is confirmed by temperature sensors associated with two or more BPRs within a BPA indicating an over-temperature condition, the frame controller can immediately reduce power consumption by requesting a low power (or power save) mode for each electronic subsystem within the electronics rack. After entering the low power mode, the affected BPA power output is shifted to the cooler BPA of the two BPAs of the AC-to-DC power supply assembly. The BPA power can be shifted from the hot BPA (e.g., >95° C.). to the cooler BPA (e.g., <85° C.) by lowering the DC/DC converter settings for all the BPRs on the hot BPA by, for example, approximately four volts. Based on the BPA load, lowering the BPA setting by four volts in the respective BPRs will result in about 25% of power being shifted from the hot BPA to the cooler BPA of the AC-to-DC power supply assembly. Once the atypical condition is addressed, normal operating conditions may be restored, with the electronic subsystems exiting the power save mode.

As a further example, consider a failure of the front bulk power fan 810 in the first, front BPA of the AC-to-DC power supply assembly of FIG. 8. If the front BPA fails, air 812 may enter the back bulk power assembly through, for example, perforations around the AC line cord area of the electronics rack. This input airflow 812 weakens the airflow to the front BPA, which may result in an over-temperature condition in the bulk power regulators of the front BPA 804. To address this problem, power load may be automatically shifted from the front BPA to the back BPA, since the back BPA is operating cooler. The shifting of power load from the front BPA to the back BPA could again be accomplished by raising the DC/DC converter settings of the BPRs in the front bulk power assembly 804. This results in a greater power load being shifted to the back BPA, which is better able to handle the load due to the better cooling of that assembly by the operation of its bulk power fan 810'.

Note that one or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 9:
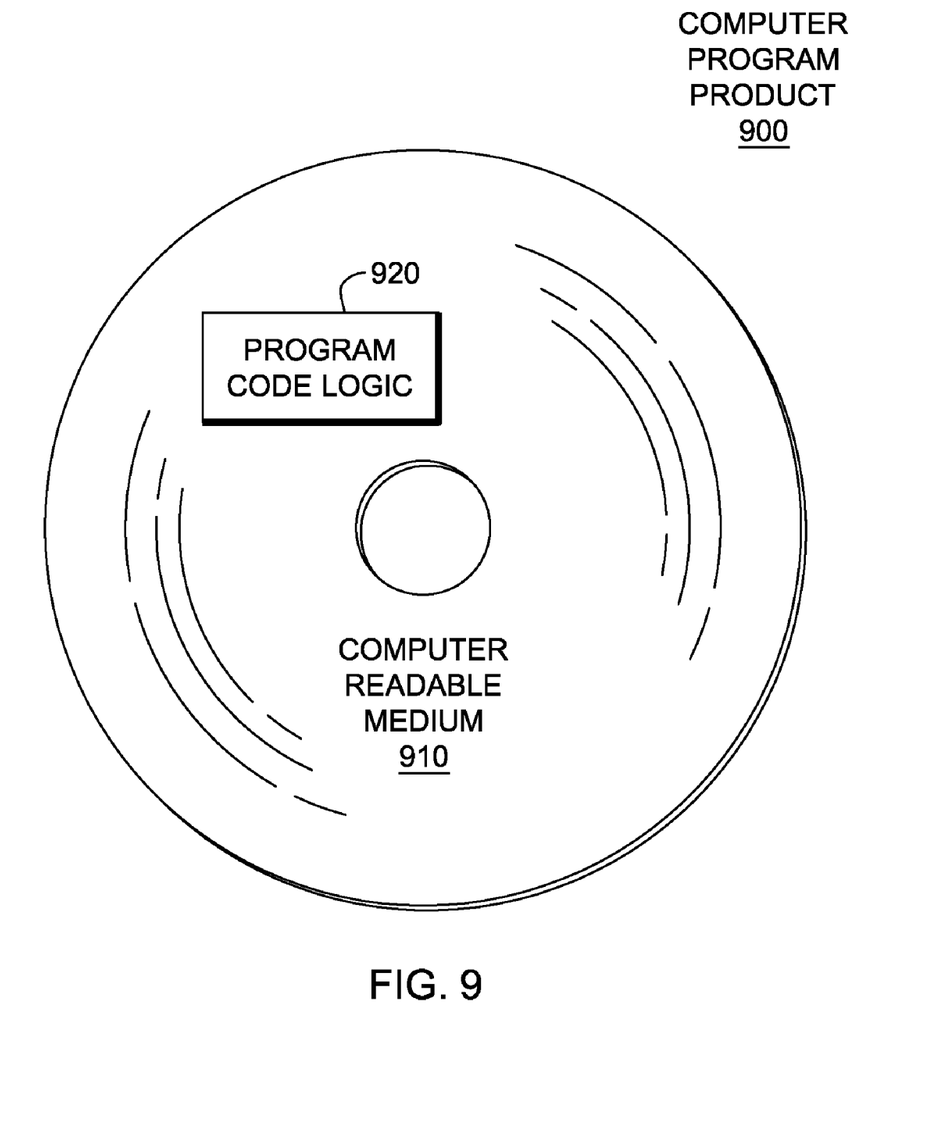
FIG. 9 depicts one embodiment of a computer program product or article of manufacture incorporating one or more aspects of the present invention.

One example of an article of manufacture or a computer program product incorporating one or more aspects of the present invention is described below with reference to FIG. 9. A computer program product 900 includes, for instance, one or more computer-readable media 910 to store computer readable program code means or logic 920 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Although various embodiments are described above, these are only examples.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagram(s) depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of controlling an AC-to-DC power supply assembly fed by a three-phase AC source, the method comprising:
   determining whether the AC-to-DC power supply assembly comprises greater than three active, single-phase power regulators feeding a common load, with multiple single-phase power regulators of the active, single-phase power regulators being connected in parallel across a common phase of the three-phase AC source;
   summing currents provided by the active, single-phase power regulators to the common load, the summing being responsive to determining that there are greater than three active, single-phase power regulators in the AC-to-DC power supply assembly being powered by the three-phase AC source and feeding the common load; and
   ascertaining whether the summed current is less than a predefined threshold, and if so, operating the AC-to-DC power supply assembly in a line balance mode to maintain power drawn on the three phases of the three-phase AC source in balance, and if greater than the predefined threshold, operating the AC-to-DC power supply assembly in a maximize power mode wherein power is provided by the AC-to-DC power supply assembly to the common load without maintaining power drawn on the three phases of the three-phase AC source in balance.

2. The method of claim 1, further comprising predefining the predefined threshold, the predefining comprising determining the predefined threshold as a function of a current limit rating of the three-phase AC source feeding the AC-to-DC power supply assembly.

3. The method of claim 1, wherein when the summed current is less than the predefined threshold, the current provided by the three-phase AC source to the AC-to-DC power supply assembly is below a current limit rating of the three-phase AC source.

4. The method of claim 1, wherein operating the AC-to-DC power supply assembly in the line balance mode comprises controlling voltage output of at least two active, single-phase power regulators of the AC-to-DC power supply assembly such that power drawn on the three phases of the three-phase AC source is in balance and current provided to the common load by the greater than three active, single-phase power regulators is non-uniform across the greater than three active, single-phase power regulators.

5. The method of claim 1, wherein operating the AC-to-DC power supply assembly in the maximize power mode comprises increasing power provided by the AC-to-DC power supply assembly as required by the common load when the summed current is greater than the predefined threshold, thereby generating an imbalance in power drawn on the three phases of the three-phase AC source.

6. The method of claim 1, wherein each active, single-phase power regulator of the greater than three active, single-phase power regulators comprises an AC-to-DC converter receiving as input one phase of the three-phase AC source and providing output to a DC-to-DC converter, each DC-to-DC converter providing power to the common load, and wherein the summing further comprises summing output current of the DC-to-DC converter of each active, single-phase power regulator, and wherein operating the AC-to-DC power supply assembly in the line balance mode comprises providing adjusted gate drive signals to each DC-to-DC converter of at least two active, single-phase power regulators to control their voltage output, and thereby facilitate balancing of power drawn on the three phases of the three-phase AC source.

7. The method of claim 1, wherein the AC-to-DC power supply assembly comprises a bulk power assembly within an electronics rack, wherein four active, single-phase power regulators feed a common load of the electronics rack, and the predefined threshold is a function of a current limit rating of the three-phase AC source, and wherein current provided by the three-phase AC source is below the current limit rating thereof when the summed current provided by the active, single-phase power regulators is below the predefined threshold.

8. The method of claim 1, wherein the AC-to-DC power supply assembly comprises a first bulk power assembly and a second bulk power assembly of an electronics rack, each bulk power assembly comprising a plurality of active, single-phase power regulators feeding the common load within the electronics rack, and wherein the method further comprises detecting an atypical condition associated with at least one of the first bulk power assembly or the second bulk power assembly, and responsive to the detecting of the atypical condition, automatically shifting power being supplied to the common load of the electronics rack by one of the first bulk power assembly or the second bulk power assembly to the other of the first bulk power assembly and the second bulk power assembly.

9. The method of claim 8, wherein the atypical condition comprises at least one of: a failure of a bulk power fan associated with one of the first bulk power assembly or the second bulk power assembly; a loss of power being supplied by the three-phase AC source coupled to one or more bulk power regulators of one of the first bulk power assembly or the second bulk power assembly; an ambient room condition out of specification; or an airflow anomaly within at least one of the first bulk power assembly or the second bulk power assembly.

10. The method of claim 8, wherein the atypical condition comprises an out of specification temperature for at least one of the first bulk power assembly or the second bulk power assembly, and wherein the method further comprises placing the electronics rack in a power save mode, wherein power requirements of the common load are reduced, and shifting power being supplied from a higher temperature bulk power assembly to a lower temperature bulk power assembly of the first bulk power assembly and the second bulk power assembly.

11. A control system for an AC-to-DC power supply assembly of an electronics rack fed by at least one three-phase AC source, the control system comprising:
a frame controller to determine when the AC-to-DC power supply assembly comprises greater than three active, single-phase power regulators being powered by a common three-phase AC source and feeding a common load within the electronics rack, with multiple single-phase power regulators of the active, single-phase power regulators being connected in parallel across a common phase of the common three-phase AC source;
at least one sensor for sensing currents provided by the greater than three active, single-phase power regulators to the common load, the provided currents being summed by the frame controller responsive to determining that there are greater than three active, single-phase power regulators in the AC-to-DC power supply assembly being powered by the common three-phase AC source and feeding the common load; and
wherein the frame controller ascertains whether the summed current is less than a predefined threshold, and if so, operates the AC-to-DC power supply assembly in a line balance mode to maintain power drawn on the three phases of the common three-phase AC source in balance, and if greater than the predefined threshold, operates the AC-to-DC power supply assembly in a maximize power mode wherein power is provided by the greater than three active, single-phase power regulators without maintaining power drawn on the three phases of the common three-phase AC source in balance.

12. The control system of claim 11, wherein the predefined threshold is a function of a current limit rating of the common three-phase AC source feeding the greater than three active, single-phase power regulators being powered by the common three-phase AC source and feeding the common load within the electronics rack.

13. The control system of claim 11, wherein when the summed current is less than the predefined threshold, the current provided by the common three-phase AC source to the greater than three active, single-phase power regulators being powered by the common three-phase AC source is below a current limit rating of the three-phase AC source.

14. The control system of claim 11, wherein operating the AC-to-DC power supply assembly in the line balance mode comprises controlling voltage output of at least two active, single-phase power regulators of the AC-to-DC power supply assembly such that power drawn on the three phases of the common three-phase AC source is in balance and current provided to the common load by the greater than three active, single-phase power regulators being powered by the common three-phase AC source is non-uniform across the greater than three active, single-phase power regulators.

15. The control system of claim 11, wherein the frame controller, when operating the AC-to-DC power supply assembly in the maximize power mode, increases power provided by the greater than three active, single-phase power regulators as required by the common load, thereby generating an imbalance in power drawn on the three phases of the common three-phase AC source.

16. The control system of claim 11, wherein the AC-to-DC power supply assembly comprises a bulk power assembly within the electronics rack, wherein four active, single-phase power regulators feed the common load within the electronics rack, and the predefined threshold is a function of a current limit rating of the common three-phase AC source, and wherein current provided by the common three-phase AC source is below the current limit rating thereof when the summed current provided by the four active, single-phase power regulators is below the predefined threshold.

17. The control system of claim 11, wherein the AC-to-DC power supply assembly comprises a first bulk power assembly and a second bulk power assembly of the electronics rack, each bulk power assembly comprising a plurality of active, single-phase power regulators feeding the common load within the electronics rack, and wherein the frame controller is configured to detect an atypical condition associated with at least one of the first bulk power assembly or the second bulk power assembly, and respond thereto by automatically shifting power being supplied to the common load of the electronics rack by one of the first bulk power assembly or the second bulk power assembly to the other of the first bulk power assembly and the second bulk power assembly.

18. The control system of claim 17, wherein the atypical condition comprises at least one of: a failure of a bulk power fan associated with one of the first bulk power assembly or the second bulk power assembly; a loss of power being supplied by the common three-phase AC source coupled to one or more bulk power regulators of one of the first bulk power assembly or the second bulk power assembly; an ambient room condition out of specification; or an airflow anomaly within at least one of the first bulk power assembly or the second bulk power assembly.

19. The control system of claim 17, wherein the atypical condition comprises an out of specification temperature for at least one of the first bulk power assembly or the second bulk power assembly, and wherein the frame controller places the electronics rack in a power save mode, wherein power requirements of the common load are reduced, and shifts power being supplied from a higher temperature bulk power assembly to a lower temperature bulk power assembly of the first bulk power assembly and the second bulk power assembly.

20. An article of manufacture comprising:
at least one computer-readable medium having computer-readable program code logic to control an AC-to-DC power supply assembly fed by a three-phase AC source, the computer-readable program code logic when executing on a processor performing:
  determining whether the AC-to-DC power supply assembly comprises greater than three active, single-phase power regulators feeding a common load, with multiple single-phase power regulators of the active, single-phase power regulators being connected in parallel across a common phase of the three-phase AC source;
  summing currents provided by the active, single-phase power regulators to the common load, the summing being responsive to determining that there are greater than three active, single-phase power regulators in the AC-to-DC power supply assembly being powered by the three-phase AC source and feeding the common load; and
  ascertaining whether the summed current is less than a predefined threshold, and if so, operating the AC-to-DC power supply assembly in a line balance mode to maintain power drawn on the three phases of the three-phase AC source in balance, and if greater than the predefined threshold, operating the AC-to-DC power supply assembly in a maximize power mode wherein power is provided by the AC-to-DC power supply assembly to the common load without maintaining power drawn on the three phases of the three-phase AC source in balance.

* * * * *